(12) United States Patent
Takahashi et al.

(10) Patent No.: US 11,486,972 B2
(45) Date of Patent: Nov. 1, 2022

(54) LASER SCANNER

(71) Applicant: TOPCON Corporation, Tokyo-to (JP)

(72) Inventors: Naoto Takahashi, Tokyo-to (JP); Yasushi Tanaka, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 1009 days.

(21) Appl. No.: 16/202,332

(22) Filed: Nov. 28, 2018

(65) Prior Publication Data

US 2019/0170862 A1 Jun. 6, 2019

(30) Foreign Application Priority Data

Dec. 6, 2017 (JP) .............................. JP2017-234524

(51) Int. Cl.
*G01S 7/481* (2006.01)
*G01S 17/42* (2006.01)

(52) U.S. Cl.
CPC .......... *G01S 7/4817* (2013.01); *G01S 7/4813* (2013.01); *G01S 17/42* (2013.01)

(58) Field of Classification Search
CPC ...... G01S 7/4817; G01S 7/4813; G01S 17/42; G01S 3/32
See application file for complete search history.

(56) References Cited

U.S. PATENT DOCUMENTS 8,705,012 B2 * 4/2014 Greiner et al. .......... G01C 3/00
9,909,871 B2 * 3/2018 Kumagai et al. .... G01C 15/008
10,048,064 B2 * 8/2018 Munro et al. .......... G01B 11/24
10,067,231 B2 * 9/2018 Zweigle et al. ........ G01S 17/42
10,422,864 B2 * 9/2019 Woloschyn et al. ..... G01C 3/08
2005/0172503 A1 8/2005 Kumagai et al.
2010/0134596 A1 6/2010 Becker
2016/0349050 A1 12/2016 Yoshino
2016/0349051 A1 12/2016 Kumagai et al.

FOREIGN PATENT DOCUMENTS

| JP | 2003-254849 A | 9/2003 |
|---|---|---|
| JP | 2004-93504 A | 3/2004 |
| JP | 2009-531674 A | 9/2009 |
| JP | 2016-223840 A | 12/2016 |
| JP | 2016-223841 A | 12/2016 |

* cited by examiner

*Primary Examiner* — Luke D Ratcliffe
(74) *Attorney, Agent, or Firm* — Nields, Lemack & Frame, LLC

(57) ABSTRACT

A laser scanner comprising a main base, a distance measuring optical assembly for measuring a distance to the object to be measured, a rotation irradiating assembly for performing the rotary irradiation of the distance measuring light, a case which accommodates the distance measuring optical assembly and the rotation irradiating assembly, and an adapter, wherein a case includes a case frame, a left case, and a right case, the case frame includes a lower frame portion, the lower frame portion includes a left partition and a right partition, a liquid-tight space to accommodate the distance measuring optical assembly is formed when the left case is mounted, and the distance measuring optical assembly is exposed when the left case is removed, liquid-tight space to accommodate the rotation irradiating assembly is formed when the right case is mounted, and the rotation irradiating assembly is exposed when the right case is removed.

9 Claims, 4 Drawing Sheets

LASER SCANNER

BACKGROUND OF THE INVENTION

The present invention relates to a laser scanner which rotary irradiation a distance measuring light on one axis and acquires a piece of point cloud data.

As a surveying instrument, there is a surveying instrument which irradiates a distance measuring light and measures a point, for instance, a total station. Further, as a surveying instrument, there is also a surveying instrument, which scans an object to be measured with the distance measuring light, for instance a laser scanner, acquires point cloud data, and performs a shape measurement of the object to be measured.

In the measurement in the recent years, a shape measurement of an object to be measured is performed in parallel with a measurement of a predetermined point of the object to be measured in some situations. In this case, according to a conventional way, for instance, a total station and a laser scanner are prepared, and the measurement of a point by the total station and the shape measurement by the laser scanner are carried out, respectively. Thus, besides the total station, the expensive laser scanner is required.

On the other hand, a surveying instrument such as a total station has a highly-precise horizontal rotation mechanism from the beginning. When a laser scanner, which performs a uniaxial vertical rotary irradiation, is configured to be able to use this horizontal rotation mechanism, the shape measurement of an object to be measured can be carried out without preparing an expensive laser scanner.

Alternatively, when a laser scanner, which performs the uniaxial vertical rotary irradiation, is configured to be mounted in a moving device such as a vehicle, by performing the vertical rotary irradiation by the laser scanner in accordance with the movement of the moving device, it is possible to carry out the shape measurement of an object to be measured.

SUMMARY OF THE INVENTION

It is an object of the present invention to provide a laser scanner, which rotary-irradiates a distance measuring light on one axis, is an independent device and is mountable on an other device or mechanism.

To attain the object as described above, a laser scanner according to the present invention includes a main base, a distance measuring optical assembly which is provided on the main base, projects the distance measuring light receives the reflected distance measuring light from an object to be measured, and measures a distance to the object to be measured, a rotation irradiating assembly which is provided on the main base and performs the rotary irradiation of the distance measuring light projected from the distance measuring optical assembly by the rotation of a scanning mirror, a case which accommodates the distance measuring optical assembly and the rotation irradiating assembly, is mounted to the main base, and has the rigidity lower than that of the main base, and an adapter which is mounted to the main base and mountable to other device, wherein the case includes a case frame liquid-tightly mounted to the main base, a left case, and a right case, the case frame includes a lower frame portion which is continuous over the whole circumference in the horizontal direction, the lower frame portion includes a left partition and a right partition which form a space at a central portion, the left case is liquid-tightly and detachably mounted between the left partition and the lower frame portion, forms a liquid-tight space to accommodate the distance measuring optical assembly when the left case is mounted, and exposes the distance measuring optical assembly when the left case is removed, the right case is liquid-tightly and detachably mounted between the right partition and the lower frame member, forms a liquid-tight space to accommodate the rotation irradiating assembly when the right case is mounted, and exposes the rotation irradiating assembly when the right case is removed, the scanning mirror is accommodated in the space, a transparent plate is provided between the left partition and the right partition, and the space is liquid-tightly closed.

Further, in the laser scanner according to a preferred embodiment, the adjustment of the distance measuring optical assembly and the rotation irradiating assembly is completed in a state where they are being mounted on the main base.

Further, in the laser scanner according to the preferred embodiment, an adapter to mount the laser scanner is detachably mounted to the main base, and the adapter is exchanged in correspondence with an object to which the laser scanner is mounted.

Further, in the laser scanner according to the preferred embodiment, the lower frame portion is externally fitted to the main base, the lower frame portion includes divided engaging portions, and the lower frame portion is bolted to the main base via the engaging portions, respectively.

Furthermore, in the laser scanner according to the preferred embodiment, the left partition and the right partition are coupled by a coupling portion, the coupling portion is formed into a more constricted shape than the left and right parts of the lower frame portion, a cylinder with a vertical axis with respect to the main base is formed at the center of the coupling portion, and the cylinder is connected to the left partition and the right partition by conical curves or curves which approximate the conical curves.

According to the present invention, a laser scanner including a main base, a distance measuring optical assembly which is provided on the main base, projects the distance measuring light, receives the reflected distance measuring light from an object to be measured, and measures a distance to the object to be measured, a rotation irradiating assembly which is provided on the main base and performs the rotary irradiation of the distance measuring light projected from the distance measuring optical assembly by the rotation of a scanning mirror, a case which accommodates the distance measuring optical assembly and the rotation irradiating assembly, is mounted to the main base, and has the rigidity lower than that of the main base, and an adapter which is mounted to the main base and mountable to other device, wherein the case includes a case frame liquid-tightly mounted to the main base, a left case, and a right case, the case frame includes a lower frame portion which is continuous over the whole circumference in the horizontal direction, the lower frame portion includes a left partition and a right partition which form a space at a central portion, the left case is liquid-tightly and detachably mounted between the left partition and the lower frame portion, forms a liquid-tight space to accommodate the distance measuring optical assembly when the left case is mounted, and exposes the distance measuring optical assembly when the left case is removed, the right case is liquid-tightly and detachably mounted between the right partition and the lower frame member, forms a liquid-tight space to accommodate the rotation irradiating assembly when the right case is mounted, and exposes the rotation irradiating assembly when the right case is removed, the scanning mirror is accommodated in the space, a transparent plate is provided between the left partition and the right partition, and the space is liquid-tightly closed. As a result, the uniaxial laser scanner can be configured as a completed device and attached to another device, the functions of the laser scanner can be added to the other device, and the distance measuring optical assembly and the rotation irradiating assembly do not get involved in the mounting of the case, the mounting of the case does not affect the accuracies of the distance measuring optical assembly and the rotation irradiating assembly, and removing the left case and the right case enables adjusting the distance measuring optical assembly and the rotation irradiating assembly in a state where the distance measuring optical assembly and the rotation irradiating assembly are disposed to the main base.

DETAILED DESCRIPTION OF THE PREFERRED EMBODIMENT

A description will be given below on an embodiment of the present invention by referring to the attached drawing.

Figure 1:
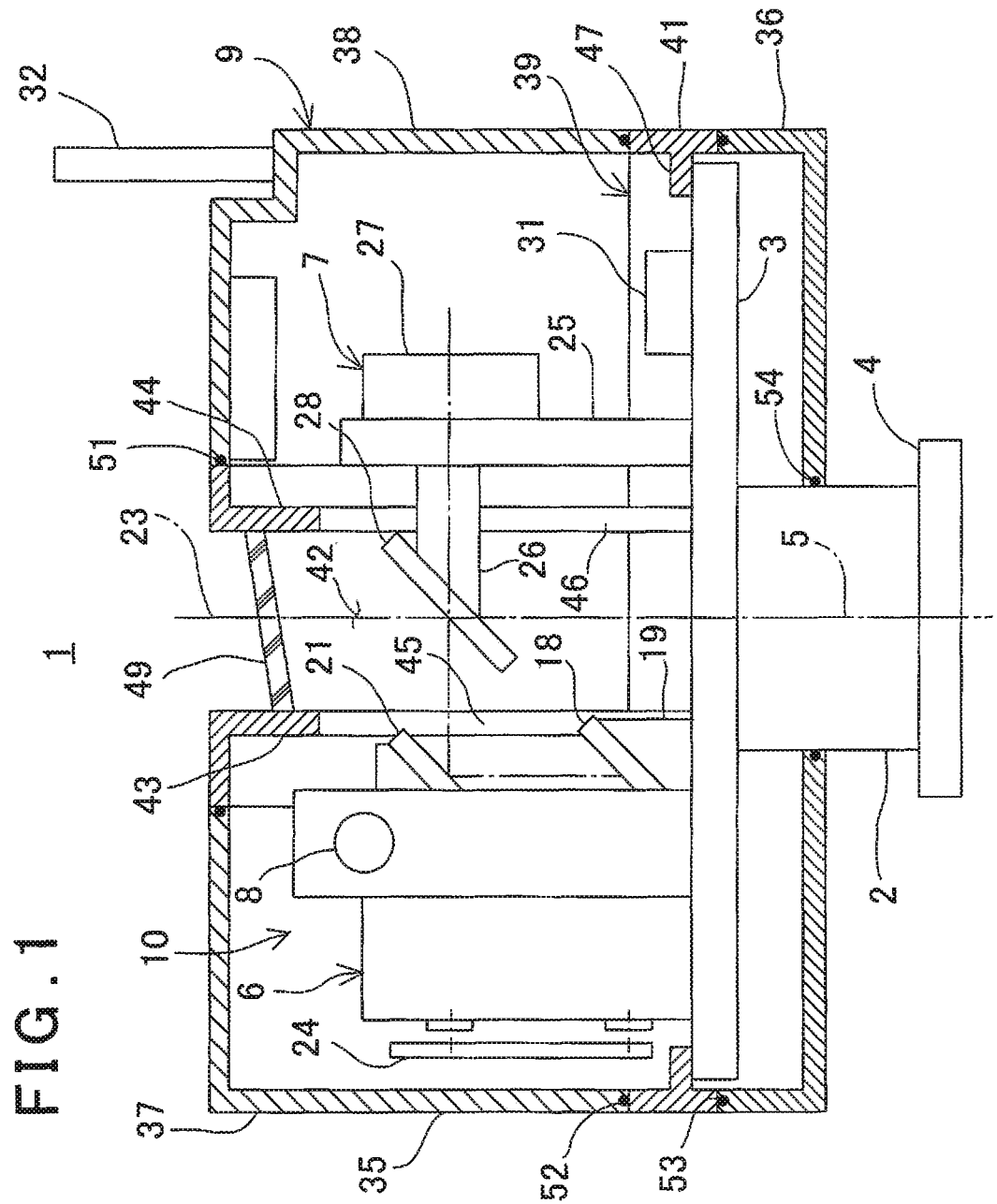
FIG. 1 is a front view of a laser scanner according to an embodiment of the present invention.
Figure 2:
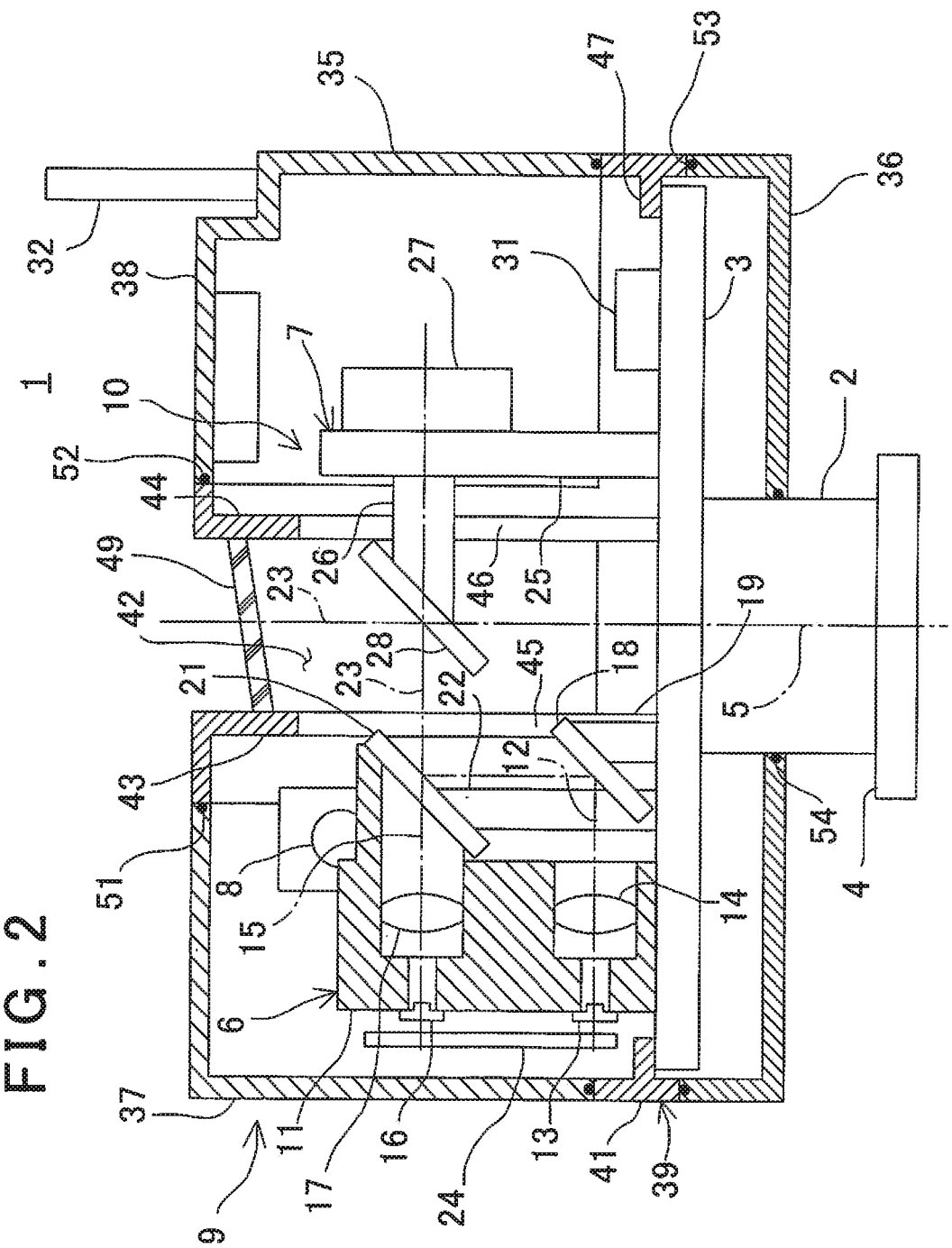
FIG. 2 is a front view of the laser scanner showing an inner outline of a distance measuring optical assembly of the laser scanner.

Referring to FIG. 1 and FIG. 2, a description will be given on a laser scanner 1 according to an embodiment of the present invention.

It is to be noted that, in the drawings, the left, right, top, and bottom in the following description correspond to the left, right, top, and bottom on the drawings, respectively.

A main base 3 is fixed to an upper end of a support column 2, and a mounting flange 4 is fixed to a lower end of the support column 2. An upper surface of the main base 3 is parallel to a lower surface (a mounting surface) of the mounting flange 4, and the upper surface of the main base 3 and the lower surface of the mounting flange 4 are orthogonal to an axis 5 of the support column 2. It is to be noted that the support column 2 and the main base 3 may be integrated with each other, or the support column 2 and the main base 3 may be separable from each other or attachable/detachable to/from each other. Further, the support column 2 functions as an adapter to mount the laser scanner 1, and a type, a shape and a structure of the support column 2 may be changed in correspondence with a state of a device (a mounting target device) to which the laser scanner 1 is mounted.

For the main base 3, a highly-rigid structural material, for instance, the stainless steel, the CFRF (Carbon Fiber Reinforced Foam), a composite material, or an aluminum-based material is used. To the main base 3 are disposed a distance measuring optical assembly 6, a rotation irradiating assembly 7, a camera assembly 8, and others which require the high accuracies. The main base 3 maintains accuracies of the components or the assemblies disposed thereto. Further, the main base 3 has the sufficient rigidity against a vibration and the like in the distance measurement in such a manner that the accuracies of the assemblies themselves and the mounting accuracies are not impaired.

The distance measuring optical assembly 6, the rotation irradiating assembly 7, the camera assembly 8, and the like make up a measuring unit 10, and the measuring unit 10 has a function as an electronic distance meter.

Further, a case 9 which accommodates the measuring unit 10 is mounted on the main base 3.

First, a description will be given on the distance measuring optical assembly 6 and the rotation irradiating assembly 7.

The distance measuring optical assembly 6 has an optical unit base 11 secured to the main base 3. The optical unit base 11 has a light emitter 13 such as a laser diode (LD) arranged on a projection optical axis 12, and a light projecting optical system (a projecting lens 14 alone is shown in the drawing).

Further, the optical unit base 11 has a photodetector 16 such as a photo diode (PD) arranged on a light receiving optical axis 15, and a light receiving optical system (a light receiving lens 17 alone is shown in the drawing).

The projection optical axis 12 and the light receiving optical axis 15 are orthogonal to the axis 5, respectively. Further, the projection optical axis 12 is parallel to the light receiving optical axis 15, and a distance between them is known.

A first deflecting optical component 18 is arranged on the projection optical axis 12, and the first deflecting optical component 18 is provided on the main base 3 by a fixing member 19. As the first deflecting optical component 18, a prism, a mirror, or the like is used.

The projection optical axis 12 is deflected by the first deflecting optical component 18. The deflected projection optical axis 12 crosses the light receiving optical axis 15. At an intersection of the light receiving optical axis 15 and the projection optical axis 12, a second deflecting optical component 21 is arranged. The second deflecting optical component 21 is provided on the main base 3 by a fixing member 22.

The second deflecting optical component 21 is a beam splitter which has the optical characteristics to reflect a part of the distance measuring light and to transmit a remaining part of the same therethrough, and a prism, a half mirror, or the like is used.

The second deflecting optical component 21 further deflects the projection optical axis 12 which has been deflected by the first deflecting optical component 18 so that the projection optical axis 12 can coincide with the light receiving optical axis 15. Here, an optical axis, where the projection optical axis 12 and the light receiving optical axis 15 coincide, is assumed to be a distance measuring optical axis 23.

The distance measuring optical assembly 6 further has a distance measuring control circuit 24 provided thereto. The distance measuring control circuit 24 controls the light emission of the light emitter 13, processes a light receiving signal from the photodetector 16, and performs the distance measurement.

The rotation irradiating assembly 7 has a motor base 25 secured to the main base 3.

A rotation shaft 26 is rotatably provided to the motor base 25. An axis of the rotation shaft 26 is orthogonal to the axis 5 and concentric with the light receiving optical axis 15. Further, a scanning motor 27 is disposed to the motor base 25, and the scanning motor 27 is coupled with the rotation shaft 26.

A scanning mirror 28 is fixed to a tip of the rotation shaft 26. The scanning mirror 28 faces the second deflecting optical component 21, and the scanning mirror 28 deflects the distance measuring optical axis 23 at a right angle.

Further, the scanning mirror 28 is rotated around the rotation shaft 26 by the scanning motor 27, and the distance measuring optical axis 23 rotates within a plane orthogonal to an axis of the rotation shaft 26.

A rotation angle of the distance measuring optical axis 23 is detected by an encoder (not shown) which is incorporated in the scanning motor 27 or coupled with the scanning motor 27.

A control unit 31 is provided on the main base 3. The control unit 31 is configured to per a synchronous control of the scanning moor 27 and the distance measuring optical assembly 6, and to detect a rotation angle of the scanning mirror 28, and the like.

An antenna 32 is provided at a necessary position of the case 9. The antenna 32 is electrically connected with the control unit 31 through a flexible member, for instance, a code or a sheet with a circuit printed in such a manner that a load does not act between the control unit 31 and the case 9. The control unit 31 performs the data communication and the transmission/reception of a synchronous control signal with an external device via the antenna 32.

The distance measuring light emitted from the light emitter 13 is converted into the parallel light by the projecting lens 14, sequentially reflected by the first deflecting optical component 18, the second deflecting optical component 21, and the scanning mirror 28, and projected onto the distance measuring optical axis 23. Further, when the scanning mirror 28 is rotated, the distance measuring light is rotary-irradiated.

The reflected distance measuring light reflected from an object to be measured is incident on the scanning mirror 28, deflected to the light receiving optical axis 15 by the scanning mirror 28, and enters the photodetector 16 through the light receiving lens 17. Based on a light receiving signal from the photodetector 16, a distance to the object to be measured is measured. Further, a rotation angle of the scanning mirror 28 at the time of the distance measurement is detected (the angle measurement), and three-dimensional data of an irradiation point of the distance measuring light is acquired based on a distance measurement result and a rotation angle detection result.

Further, by rotating the scanning mirror 28, the distance measuring light is scanned linearly. When the distance measurement and the angle measurement are carried out at the intervals of a predetermined time, a one-dimensional point cloud data along a scanning line can be acquired.

The camera assembly 8 is made up by a camera or a wide-angle camera and a support member which supports the camera. Further, the camera assembly 8 has an optical axis parallel to a rotation plane of the distance measuring optical axis 23, and acquires an image including the object to be measured.

A description will be given blow on the case 9.

The case 9 is made of a material with the lower rigidity than that of the main base 3, for instance, a synthetic resin, and the case 9 has a liquid-tight structure (a waterproof structure).

The case 9 is constituted of an upper case 35 and a bottom case 36. The upper case 35 is further constituted of a left case 37, a right case 38 and a case frame 39.

The distance measuring optical assembly 6 is accommodated in the left case 37. The rotation irradiating assembly 7 is accommodated in the right case 38. Further, the scanning mirror 28 is accommodated in a space 42 (as described later).

The case frame 39 has an integral structure, has a lower frame portion 41 as a part which is externally fitted to the main base 3 and continuous over the whole circumference in the horizontal direction, and has a left partition 43 and a right partition 44 which face each other in such a manner that the space 42 is formed in a central portion. The window holes 45 and 46 are formed in the left partition 43 and the right partition 44, respectively. The window holes 45 and 46 enable the insides of the left case 37 and the right case 38 to become continuous with the space 42.

The case frame 39 has the integral structure, and the lower frame portion 41 is externally fitted to the main base 3. Therefore, the case frame 39 and the main base 3 are easily positioned, and a positional adjustment between the case frame 39 and the main base 3 is not needed.

Two or more engaging portions 47 are separately protruded at the necessary positions on an inner surface of the lower frame portion 41. Each engaging portion 47 is fixed to the main base 3 by a single bolt respectively.

The engaging portions 47 are not continuous in the circumferential direction, and each engaging portion 47 is fixed by the single bolt. Therefore, even if there is a shape error between the lower frame portion 41 and the main base 3, this error is dispersed and absorbed by a deformation of the lower frame portion 41. As a result, when the lower frame portion 41 is mounted to the main base 3, a stress is prevented from being produced.

A transparent plate 49 of a glass, a synthetic resin, or the like is crossed over the front and rear side surfaces and a ceiling surface between the left partition 43 and the right partition 44. The transparent plate 49 is liquid-tightly fixed to the left partition 43 and the right partition 44 by a method of, for instance, the bonding or the welding, and the space 42 is liquid-tightly sealed.

It is to be noted that the transparent plate 49 is inclined to the distance measuring optical axis 23 so that the distance measuring light reflected on a surface of the transparent plate 49 does not enter the distance measuring optical assembly 6.

As regards the left and right sides of the lower frame portion 41, an upper surface and three side surfaces are opened so that the distance measuring optical assembly 6 and the rotation irradiating assembly 7 are exposed.

Each of the left case 37 and the right case 38 has a box-like shape having two surfaces, namely, a side surface on a central side and a lower surface are opened, and it is disposed to a left or right opened portion of the lower frame portion 41 via a detachable engaging tool such as a bolt. A sealed chamber is formed in each of the left case 37 and the right case 38.

After the case frame 39 is mounted to the main base 3, the upper case 35 is mounted to the case frame 39.

At a joint portion between the case frame 39 and the left case 37, an O-ring 51 as a seal member is provided. At a joint portion between the case frame 39 and the right case 38, an O-ring 52 as a seal member is provided. At a joint portion between the case frame 39 and the bottom case 36, an O-ring 53 as a seal member is provided. At a joint portion between the bottom case 36 and the support column 2, an O-ring 54 as a seal member is provided.

Thus, the case 9 has a waterproof structure, and the left partition 43 and the right partition 44 are attachable/detachable even after assembling the case 9.

Next, a description will be given below on an assembling procedure of the measuring unit 10 and the case 9.

In a state where the support column 2 and the main base 3 are integrated, the distance measuring optical assembly 6 and the rotation irradiating assembly 7 are mounted to the main base 3.

Regarding adjustment of the distance measuring optical assembly 6 and the rotation irradiating assembly 7, each of the distance measuring optical assembly 6 and the rotation irradiating assembly 7 may be adjusted in advance. Alternatively, the distance measuring optical assembly 6 and the rotation irradiating assembly 7 are mounted to the main base 3, and then the distance measuring optical assembly 6 and the rotation irradiating assembly 7 may be adjusted, respectively.

After the completion of the adjustment of the distance measuring optical assembly 6 and the rotation irradiating assembly 7, the lower frame portion 41 is mounted to the main base 3. Then, the bottom case 36 is mounted to the case frame 39.

In this state, the distance measuring optical assembly 6 and the rotation irradiating assembly 7 are exposed. Therefore, the final adjustment can be performed to the distance measuring optical assembly 6 and the rotation irradiating assembly 7, or the readjustment can be carried out when the adjustment is required.

Upon completing the final adjustment, the left partition 43 and the right partition 44 are mounted to the case frame 39.

When the distance measuring optical assembly 6 and the rotation irradiating assembly 7 are driven, the distance measuring light emitted from the light emitter 13 is projected through the transparent plate 49. Further, when the scanning mirror 28 is rotated, the distance measuring light is rotary-irradiated within a plane.

Thus, the laser scanner 1 is completed as a uniaxial laser scanner with a predetermined accuracy.

Further, when the laser scanner 1 is mounted to other driving mechanism, the laser scanner 1 can be used as a two-dimensional laser scanner.

For instance, when the support column 2 is mounted on a horizontally-rotatable table (not shown), it is possible to realize a laser scanner which is capable of rotary-irradiating a laser beam on two axes, i.e., which rotates the laser beam irradiated vertically and the horizontally.

Alternatively, when the laser scanner 1 is mounted on a frame of an existing total station and a horizontal rotation function of the total station is used, the horizontal rotation of the frame and the vertical rotation of the laser scanner 1 can realize a laser scanner which is capable of rotary-irradiating a laser beam on two axes. Thus, a function of the laser scanner can be added to the total station.

It is to be noted that, in a case where the laser scanner according to the present embodiment is mounted on an existing surveying instrument such as a total station, a part for fixing, which the surveying instrument has, is used. For instance, in a case where the surveying instrument has a handle, the handle is removed, and a seat on which the handle has been mounted or a screw hole is used, and the laser scanner 1 is mounted.

In this case, the support column 2 is removed from the main base 3, and the support column 2 is exchanged to an adapter formed into a shape or a structure matching with the seat or the screw of the surveying instrument. It is to be noted that, even if the adapter is exchanged, since the measuring unit 10 (namely, the distance measuring optical assembly 6, the rotation irradiating assembly 7, and the like) mounted to the main base 3 is an independent surveying instrument, which has been completed assembling and making precision, no problem occurs in a case where the measuring unit 10 is mounted via the exchanged adapter.

Further, the laser scanner 1 may be mounted on a moving device such as a motor vehicle, and the laser scanner 1 may be operated while traveling by the motor vehicle. In this case, the laser scanner 1 functions as a two-dimensional laser scanner and the laser scanner can acquire point cloud data of a roadside area.

It is to be noted that the case 9 is constituted of the upper case 35 and the bottom case 36 in the embodiment as described above, the upper case 35 may be liquid-tightly mounted to the main base 3, and the bottom case 36 may be omitted.

Figure 3:
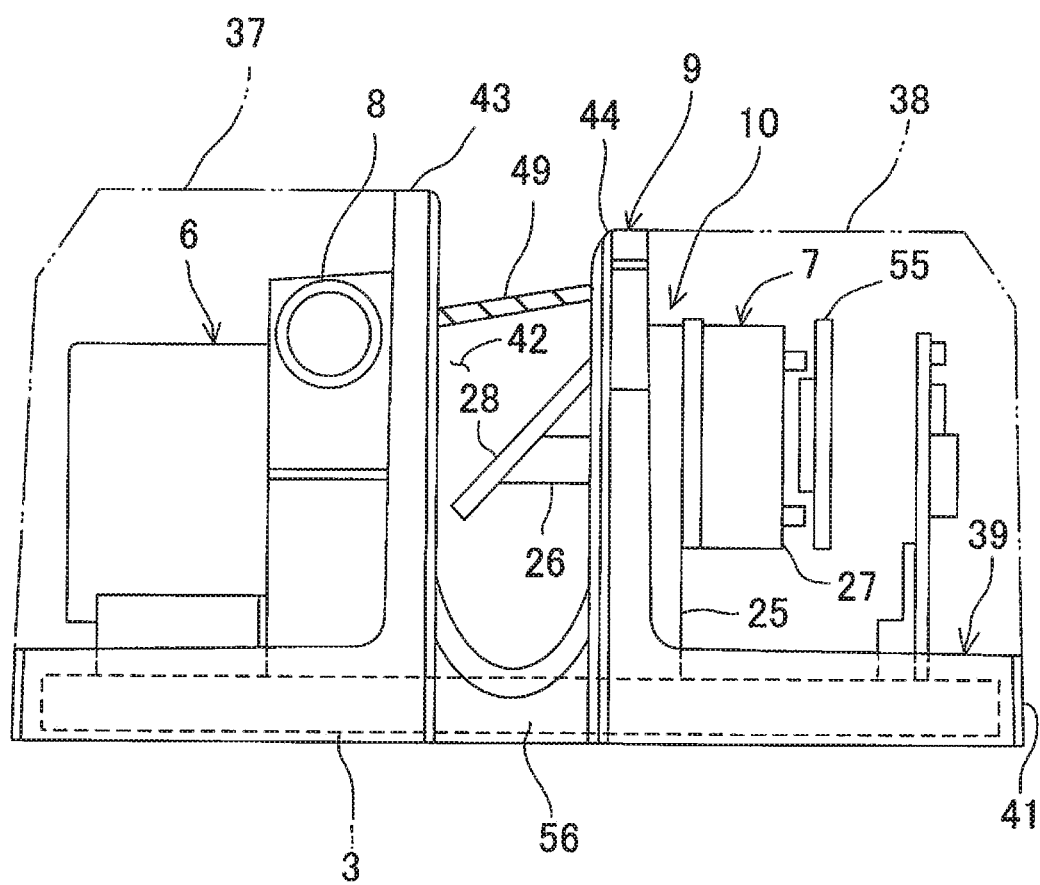
FIG. 3 is a front view of the laser scanner when this embodiment is implemented.
Figure 4:
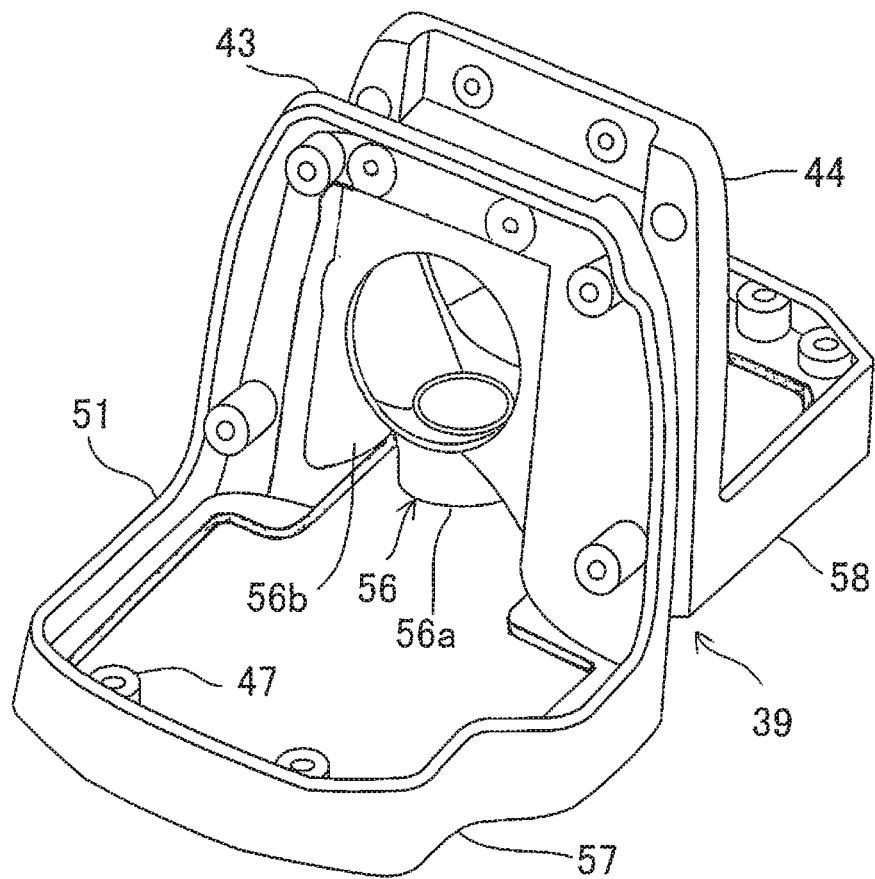
FIG. 4 is a perspective view of a case frame used in this embodiment.
Figure 5:
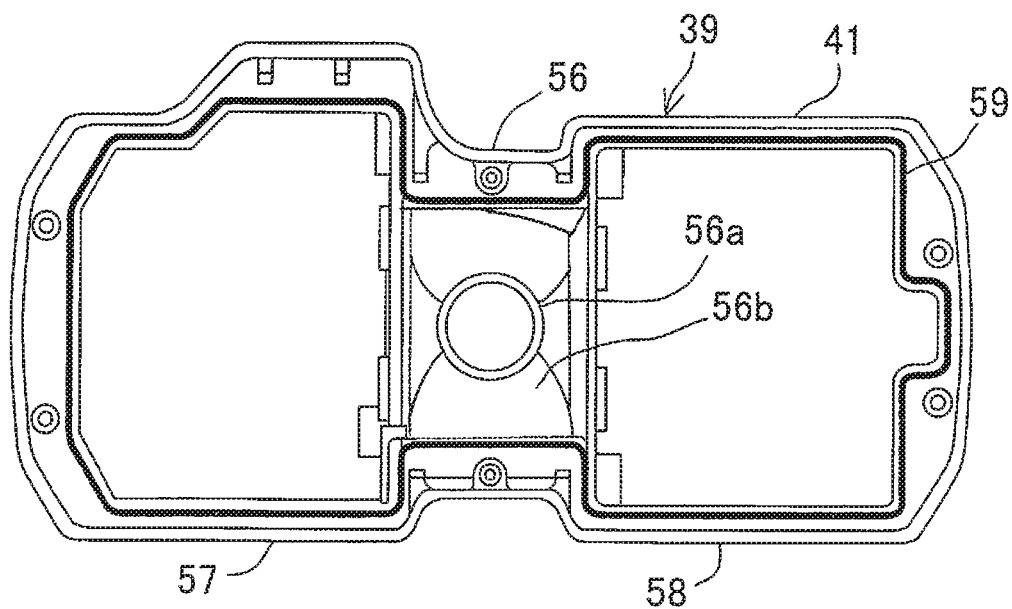
FIG. 5 is a bottom view of the case frame.

Referring to FIG. 3 and FIG. 5, a description will be further given. It is to be noted that, in FIG. 3 to FIG. 5, the same components as shown in FIG. 1 and FIG. 2 are referred by the same symbols, and a detailed description thereof will be omitted.

As described above, the case 9 which accommodates the measuring unit 10 is mainly constituted of the case frame 39, the left case 37, and the right case 38, and these members are made of a synthetic resin, respectively.

The distance measuring optical assembly 6 is accommodated in a space formed by the left partition 43 and the left case 37. The rotation irradiating assembly 7 is accommodated in a space formed by the right partition 44 and the rotation irradiating assembly 7. The scanning mirror 28 is accommodated in a space formed by the left partition 43, the right partition 44, and the transparent plate 49. In FIG. 3, a reference sign 55 denotes an encoder coupled with the scanning motor 27. Further, in FIG. 5, a reference sign 59 denotes an O-ring as a seal member for sealing the case frame 39 and the main base 3.

A structure of the case frame 39 alone has a shape which is divided into the left and right sides by the space 42 formed at the center. The divided portions are coupled via a coupling portion 56 at the center.

The distance measuring light is rotary-irradiated by a rotation of the scanning mirror 28 accommodated in the space 42. Therefore, the coupling portion 56 becomes a portion where the distance measuring light is blocked. To enable the rotary irradiation of the distance measuring light in a wide range (a wide angle), a narrower width of the coupling portion 56 is preferred. Thus, as shown in FIG. 5, the coupling portion 56 has a shape which is constricted with respect to the left and right positions 57 and 58 of the case frame 39.

As a result, the case frame 39 has a structure with a low rigidity and a low strength in the central portion.

In the case 9 (the case frame 39) according to the present embodiment, the coupling portion 56 has a hollow cylindrical portion 56a. The cylindrical portion 56a is vertical to the main base 3 and concentric with the support column 2. Further, the cylindrical portion 56a is coupled with the left partition 43 and the right partition 44 by a cylindrical support portion 56b having a plurality of conical curved surfaces or curved surfaces which approximate the conical curved surface.

A circular hole may be formed in the main base 3 at a portion which faces the cylindrical portion 56a. By irradiating a distance measuring light downward through the circular hole and the cylindrical portion 56a, a distance between the laser scanner 1 and an installation surface can be determined. Further, by confirming an irradiation point of the distance measuring light, an installation position of the laser scanner 1 can be checked.

The cylindrical portion 56a functions as a strength member which reinforces the rigidity and the strength of the coupling portion 56, and further the cylindrical portion 56a is coupled with the left partition 43 and the right partition 44 by a cylindrical support portion 56b of a shape with the high rigidity. Therefore, though the case frame 39 has a shape with a constricted part at the central portion, the case frame 39 has the structure with the high strength and the high rigidity.

Further, the transparent plate 49 is provided so as to seal the space 42 and the transparent plate 49 is bonded or welded to the left partition 43 and the right partition 44. Therefore, a member which surround the space 42 has a structure with a closed cross section, and the rigidity and the strength are reinforced. Thus, the case frame 39 is made of a synthetic resin, but the sufficient rigidity and a high product accuracy can be obtained.

Thus, when the case frame 39 with the integral structure is fitted to the main base 3 from above, the assembling of the case frame 39 and the main base 3 is easily completed.

As described above, in the present invention, the distance measuring optical assembly 6 and the rotation irradiating assembly 7 are not involved in the mounting of the case 9. Therefore, the mounting of the case 9 does not affect the accuracies of the distance measuring optical assembly 6 and the rotation irradiating assembly 7. Further, when the left case 37 and the right case 38 are removed, the distance measuring optical assembly 6 and the rotation irradiating assembly 7 can be adjusted in a state where the distance measuring optical assembly 6 and the rotation irradiating assembly 7 are being mounted on the main base 3.

The invention claimed is:

1. A laser scanner comprising: a main base, a distance measuring optical assembly provided on said main base, for projecting the distance measuring light, for receiving the reflected distance measuring light from an object to be measured and for measuring a distance to said object to be measured, a rotation irradiating assembly provided on said main base and for performing the rotary irradiation of said distance measuring light projected from said distance measuring optical assembly by the rotation of a scanning mirror, a case for accommodating said distance measuring optical assembly and said rotation irradiating assembly, mounted to said main base and having the rigidity lower than that of said main base, and an adapter mounted to said main base and mountable to other device, wherein said case includes a case frame, a left case, and a right case, which are liquid-tightly mounted to said main base, said case frame includes a lower frame portion which is continuous over the whole circumference in the horizontal direction, said lower frame portion includes a left partition and a right partition which form a space at a central portion, said left case is configured to be liquid-tightly and detachably mounted between said left partition and said lower frame portion, to form a liquid-tight space for accommodating said distance measuring optical assembly when said left case is mounted and to expose said distance measuring optical assembly when said left case is removed, said right case is configured to be liquid-tightly and detachably mounted between said right partition and said lower frame member, to form a liquid-tight space for accommodating said rotation irradiating assembly when said right case is mounted and to expose said rotation irradiating assembly when said right case is removed, said scanning mirror is accommodated in said space, a transparent plate is provided between said left partition and said right partition, and said space is liquid-tightly closed, and wherein said distance measuring optical assembly and said rotation irradiating assembly are not involved in the mounting of said case.

2. The laser scanner according to claim 1, wherein the adjustment of said distance measuring optical assembly and said rotation irradiating assembly is completed in a state where said distance measuring optical assembly and said rotation irradiating assembly are being mounted on said main base.

3. The laser scanner according to claim 1, wherein an adapter for mounting said laser scanner is detachably mounted to said main base, and said adapter is exchanged in correspondence with an object to which said laser scanner is mounted.

4. The laser scanner according to claim 1, wherein said lower frame portion is externally fitted to said main base, said lower frame portion has divided engaging portions, and said lower frame portion is bolted to said main base via the engaging portions, respectively.

5. The laser scanner according to claim 1, wherein said left partition and said right partition are coupled by a coupling portion, said coupling portion is a more constricted shape than the left and right parts of said lower frame portion, a cylinder with a vertical axis with respect to said main base is formed at the center of said coupling portion, and said cylinder is connected to said left partition and said right partition by conical curves or curves which approximate the conical curves.

6. The laser scanner according to claim 2, wherein said lower frame portion is externally fitted to said main base, said lower frame portion has divided engaging portions, and said lower frame portion is bolted to said main base via the engaging portions, respectively.

7. The laser scanner according to claim 3, wherein said lower frame portion is externally fitted to said main base, said lower frame portion has divided engaging portions, and said lower frame portion is bolted to said main base via the engaging portions, respectively.

8. The laser scanner according to claim 2, wherein said left partition and said right partition are coupled by a coupling portion, said coupling portion is more constricted shape than the left and right parts of said lower frame portion, a cylinder with a vertical axis with respect to said main base is formed at the center of said coupling portion, and said cylinder is connected to said left partition and said right partition by conical curves or curves which approximate the conical curves.

9. The laser scanner according to claim 3, wherein said left partition and said right partition are coupled by a coupling portion, said coupling portion is a more constricted shape than the left and right parts of said lower frame portion, a cylinder with a vertical axis with respect to said main base is formed at the center of said coupling portion, and said cylinder is connected to said left partition and said right partition by conical curves or curves which approximate the conical curves.

\* \* \* \* \*